(No Model.)
T. C. DOOLITTLE.
BALE BAND CUTTER.
No. 256,301. Patented Apr. 11, 1882.
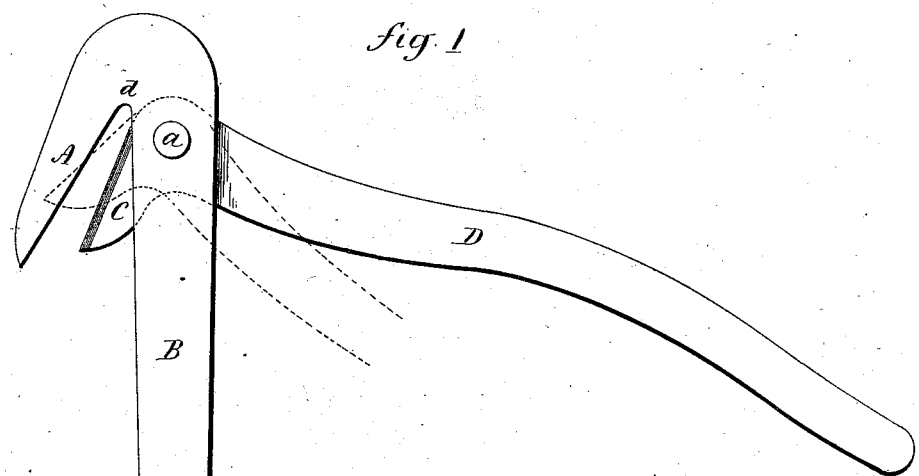
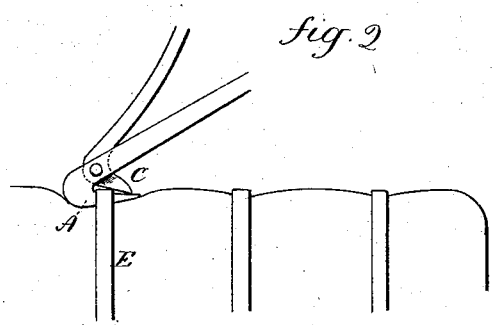

UNITED STATES PATENT OFFICE.

THOMAS C. DOOLITTLE, OF NEW HARTFORD, CONNECTICUT.

BALE-BAND CUTTER.

SPECIFICATION forming part of Letters Patent No. 256,301, dated April 11, 1882.

Application filed February 13, 1882. (No model.)

*To all whom it may concern:*

Be it known that I, THOMAS C. DOOLITTLE, of New Hartford, in the county of Litchfield and State of Connecticut, have invented a new Improvement in Bale-Band Cutters; and I do hereby declare the following, when taken in connection with the accompanying drawings, and the letters of reference marked thereon, to be a full, clear, and exact description of the same, and which said drawings constitute part of this specification, and represent, in—

Figure 1, a side view. Fig. 2 illustrates the use and operation.

This invention relates to a device for cutting the metal bands of cotton and other bales. Cotton comes to the mill in bales bound with metal bands, which bands must be cut before the bales can be opened. The opening of the bale is made in or near the picker-room, where there is great danger from fire, so that great care is required to be exercised in cutting the bands, that a spark be not produced in so doing. Hence the use of an instrument which requires a blow to produce the cutting operation is prohibited. Instruments like a pair of shears—that is, a pair of blades hung upon a pivot, one blade inserted beneath the band and the other blade brought upon it, cutting from the heel to the point of the blade—are generally used; but in the use of this instrument the cutting causes the blade to slip upon the band until the edge to be cut is a considerable distance from the heel or pivot of the blade, so that a large proportion of the leverage is lost and the cutting is difficult.

The object of this invention is to construct an instrument which will cut from the point toward the heel of the blade—that is, will commence its cut upon the opposite side of the band from that at which the instrument is introduced; and it consists in a pair of cutting-blades each provided with its handle and pivoted together, the relation of the blades to each other being such that the cutting-edges come together first at the point, thence approaching the heel.

A represents one blade, which is formed on or made a part of the handle or lever B, and so that with the handle it forms a hook-like instrument, which may be readily inserted beneath the band, as seen in Fig. 2. The edge of the blade A next the lever is of common shear character.

C is the second blade, attached to or made a part of the handle D, and hinged to the other part by a pivot, $a$, at a point above the cutting-edge of the blade A. The blade C has a shear-like edge corresponding to the edge of the blade A, so that in swinging the one its blade will pass the edge of the other, similar to the cutting edges of common shears; but because of the pivot $a$ being above the cutting-edges, instead of in line therewith, it follows that in turning the blade C toward the blade A its point first engages the edge of the other blade, A, as seen in broken lines, Fig. 1, so that the cut will commence at the point of the blades, instead of at the heel, or near the pivot, and will cut from that point toward the pivot, instead of from the pivot toward the point, as in common shears.

The blade A is made pointed, so as to be easily passed beneath the band E, as seen in Fig. 2, bringing the band between the two blades. Then the workman forces the two handles toward each other, bringing the second blade, C, upon the edge of the band opposite to which the blade was inserted, cutting from that opposite edge toward the other, the heel $d$ of the blade forming a bearing against which the heel-edge of the band will rest as a resistance to the advancing cut of the blades. By this construction the blades cannot slip upon the band. The leverage of cutting increases from the time the cut commences until the band is severed instead of diminishing, as in common shears.

I claim—

The herein-described cutters, consisting of the one handle, B, provided with a hook-shape blade, A, for insertion beneath the band, combined with the second handle, D, provided with a blade, C, corresponding with the blade A, the two pivoted together at a point above the cutting-edge of both blades, the heel $d$ of the blade A forming a bearing against which one edge of the band rests, and whereby the cutting of the blades commences at their point ends and cuts from the opposite edge of the band toward the heel of the blades, substantially as described.

THOMAS C. DOOLITTLE.

Witnesses:
 JOHN ALLEN,
 N. J. HARRIS.